United States Patent [19]
Kojima et al.

[11] Patent Number: 5,979,507
[45] Date of Patent: Nov. 9, 1999

[54] GAS FLOW PASS

[75] Inventors: Masaru Kojima; Toshio Yamada, both of Nagoya, Japan

[73] Assignee: NGK Insulators, Ltd., Japan

[21] Appl. No.: 08/788,844

[22] Filed: Jan. 27, 1997

[30] Foreign Application Priority Data

Jan. 31, 1996 [JP] Japan ................................. 8-015343

[51] Int. Cl.⁶ ................................. F15D 1/02; F07C 7/052
[52] U.S. Cl. ........................ 138/39; 138/39; 60/39.092 R; 60/275
[58] Field of Search ................... 60/39.092, 275; 467/579; 422/174, 180; 241/5; 431/208; 123/520; 415/121.2; 55/306; 138/39

[56] References Cited

U.S. PATENT DOCUMENTS

| | | | |
|---|---|---|---|
| 4,355,504 | 10/1982 | Liu et al. | 60/275 |
| 4,365,952 | 12/1982 | Ohmukai et al. | 431/208 |
| 4,527,387 | 7/1985 | Lastrina et al. | 60/39.092 |
| 4,867,634 | 9/1989 | Baker et al. | 415/121.2 |
| 4,928,480 | 5/1990 | Oliver et al. | 60/39.092 |
| 5,103,794 | 4/1992 | Shiraishi | 123/520 |
| 5,139,545 | 8/1992 | Mann | 55/306 |
| 5,143,303 | 9/1992 | Niemi | 241/5 |
| 5,500,256 | 3/1996 | Watabe | 427/579 |
| 5,567,395 | 10/1996 | Okabe et al. | 422/180 |
| 5,569,455 | 10/1996 | Fukui et al. | 422/174 |

FOREIGN PATENT DOCUMENTS

5-26842  2/1993  Japan .

Primary Examiner—Andres Kashnikow
Assistant Examiner—Davis Hwu
Attorney, Agent, or Firm—Parkhurst & Wendell, L.L.P.

[57] ABSTRACT

A gas flow pass has a gas flow direction deflecting member arranged in the gas flow pass for deflecting a gas flow direction outward with respect to a center of the gas flow pass, and a foreign substance trapping member arranged at a downstream position of the gas flow direction deflecting member and arranged on a part of or all of an inner surface of the gas flow pass. Therefore, it is possible to obtain the gas flow pass which can prevent a damage of the foreign substances in the gas flow and have a long term reliability.

5 Claims, 7 Drawing Sheets

FIG_1

FIG_2

FIG_3

FIG_4

FIG_5

FIG_6

FIG_7

FIG_8

GAS FLOW PASS

BACKGROUND OF THE INVENTION (1) Field of the invention

The present invention relates to a gas flow pass through which a gas and the other foreign substances including a solid member such as a metal plate and a liquid member such as water are passed.

(2) Related Art Statement

For example, in an exhaust gas flow pass of an internal combustion engine, solid members and liquid members are clashed against an inner wall of the exhaust gas flow pass, or a construction member arranged in the gas flow pass or connected with the gas flow pass at a high speed together with a gas flow, so that the inner wall of the gas flow pass or the construction member are broken. As the solid members, there are rust or welding scraps on an inner surface of the flow pass wall, dust inserted into the flow pass in the case of installation, and so on. As the liquid members, there are a condensed water and so on.

Figure 12A:
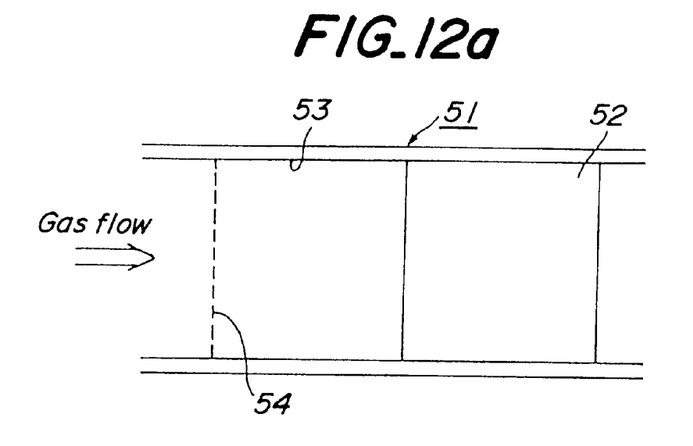
FIG. 12 is a schematic view depicting one embodiment of a known gas flow pass.
Figure 12B:
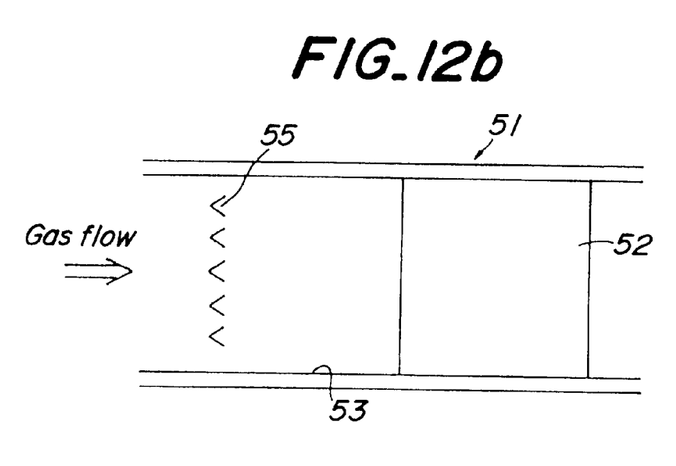
Figure 12C:
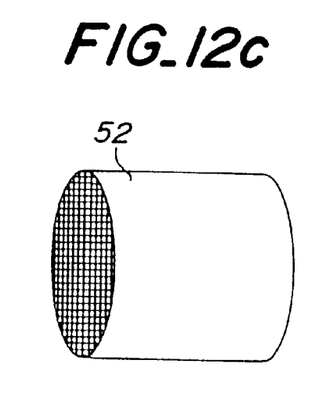

In these cases, in order to protect an inner wall 53 of a gas flow pass 51 shown in FIGS. 12a and 12b from the solid members and the liquid members, or to protect a honeycomb structural body 52 having a construction shown in FIG. 12c from a breakage, a metal net 54 shown in FIG. 12a or an protection member 55 shown in FIG. 12b is arranged at an upstream position of the gas flow pass or the honeycomb structural body 52.

However, even if the metal net 54 or the protection member 55 is arranged as mentioned above, it is not possible to eliminate completely the solid members and the liquid members, and thus a long term reliability of the gas flow pass is decreased. That is to say, a damage on the surface of the gas flow pass is generated due to foreign substances flowing from an upstream position of the gas flow pass. Moreover, a fracture of the construction member positioned at a downstream is generated due to foreign substances flowing from an upstream position of the gas flow pass. Further, in the case that the foreign substances flowing from an upstream position of the gas flow pass have a conductivity and are contacted with an electric circuit arranged in the gas flow pass, an electric short is liable to occur and thus a long term reliability of the gas flow pass can not be maintained.

SUMMARY OF THE INVENTION

An object of the invention is to eliminate the drawbacks mentioned above and to provide a gas flow pass which can prevent a damage due to the foreign substances in the gas flow and can maintain a long term reliability thereof.

According to the invention, a gas flow pass comprises, a gas flow direction deflecting means arranged in said gas flow pass for deflecting a gas flow direction outward with respect to a center of said gas flow pass, and a foreign substance trapping means arranged at a downstream position of said gas flow direction deflecting means and arranged on a part of or all of an inner surface of said gas flow pass.

In the present invention, the gas flow direction deflecting means functions to deflect a gas flow outward in the gas flow pass, and then the foreign substance trapping means functions to trap the foreign substance in the gas flow, so that it is possible to prevent a breakage of the gas flow pass.

DESCRIPTION OF THE PREFERRED EMBODIMENTS

Figure 1:
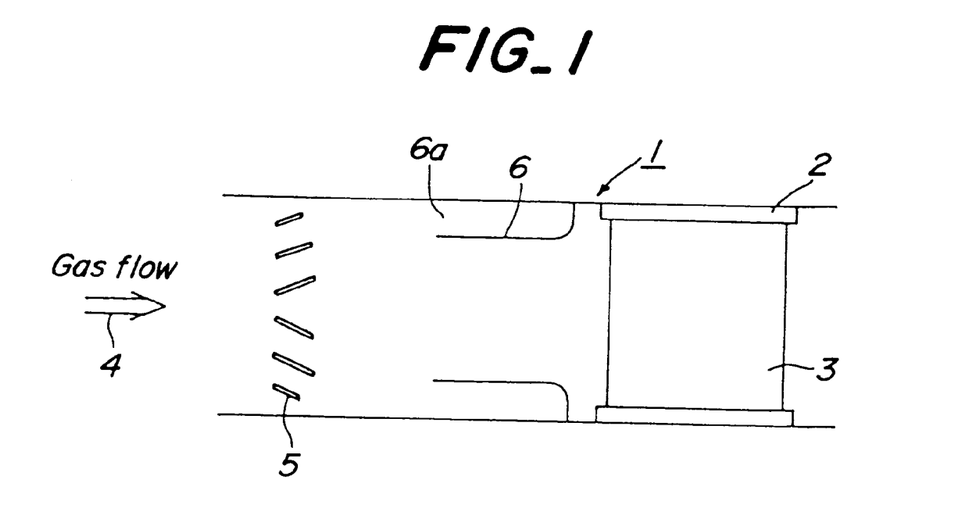
FIG. 1 is a schematic view showing one embodiment of a gas flow pass according to the invention.
Figure 2:
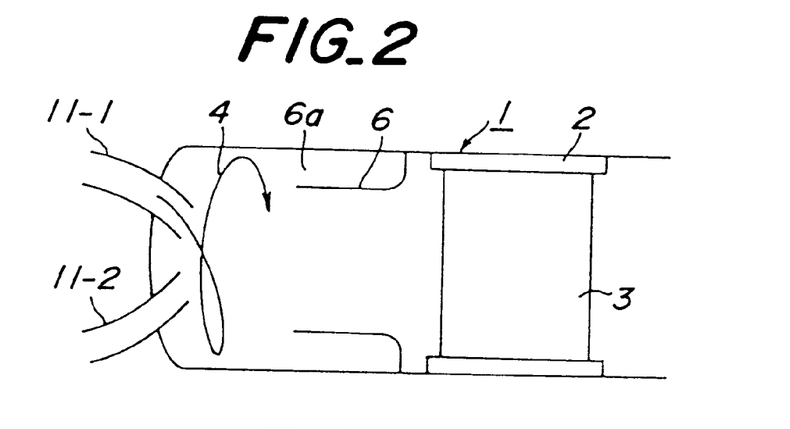
FIG. 2 is a schematic view illustrating another embodiment of the gas flow pass according to the invention.

FIG. 1 is a schematic view showing one embodiment of a gas flow pass according to the invention. In the embodiment shown in FIG. 1, a structural body 3 is arranged in a gas flow pass 1 by means of a supporting member 2. As the structural body 3, use is made of all the known bodies if a gas flow 4 can be passed through the bodies. In this embodiment, a catalyst carrier having a honeycomb structural body used in an exhaust gas purifying apparatus is used as the structural body 3. In the gas flow pass 1, as a gas flow direction deflecting means for deflecting a flow direction of the gas flow 4 toward a wall surface of the gas flow pass 1, a taper grid 5 is arranged. The taper grid 5 comprises one or a plurality of plates each having a taper angle which makes a direction of the gas flow 4 outward with respect to a center of the gas flow pass 1. Moreover, as a foreign substance trapping means for trapping foreign substances in the gas flow 4, a receiving member 6 having a pocket-like shape is arranged at a downstream position of the taper grid 5 and at an upstream position of the structural body 3. The receiving member 6 has an opening portion 6a opened toward an upstream direction of the gas flow 4 and has a double tube structure together with all the inner surface of the gas flow pass 1. In this case, a shape of the taper grid 5 may be planar or circular, but it is not limited.

In the gas flow pass 1 shown in FIG. 1, the gas flow 4 is passed through the taper grid 5, so that a direction of the gas flow 4 is deflected toward an inner wall of the gas flow pass 1. Therefore, foreign substances in the gas flow 4 such as solid members including rust on an inner wall of the gas flow pass 1, dust inserted into the gas flow pass 1 in the case of installation and so on, and liquid members such as a condensed water and so on, can be flowed into a pocket-like receiving member 6 through the opening portion 6a together with the deflected gas flow 4. In this case, since the solid members and the liquid members are heavy in weight as compared with gas, only the foreign substances such as the solid members and the liquid members remain in the pocket-like receiving member 6, and gas is flowed out of the receiving member 6 and is flowed toward a downstream side. In this manner, the foreign substances included in the gas flow 4 can be trapped by the pocket-like receiving member 6. As a result, the gas flow which passed through the pocket-like receiving member 6 has no foreign substances, and thus it is possible to prevent a breakage of the structural body 3 in the gas flow pass 1 positioned at a downstream side of the receiving member 6.

FIGS. 2 to 6 are schematic views respectively showing another embodiment of the gas flow pass according to the invention. In each embodiments shown in FIGS. 2 to 6, portions similar to those of FIG. 1 are denoted by the same reference numerals as those of FIG. 1, and the explanations thereof are omitted here. In the embodiment shown in FIG. 2, a different feature as that of FIG. 1 is that use of pipes 11-1 and 11-2 as the flow direction deflecting means of the gas flow 4. The pipes 11-1 and 11-2 through which the gas flow 4 is introduced are arranged so as to rotate the gas flow 4 along an inner wall of the gas flow pass 1 in a spiral manner. That is to say, the pipes 11-1 and 11-2 are arranged in such a manner that tip portions thereof are mutually turned toward a downstream side along an inner wall of the gas flow pass 1. Therefore, in the embodiment shown in FIG. 2, the foreign substances in the gas flow 4 can be effectively trapped by the pocket-like receiving member 6, and thus it is possible to improve a foreign substance trapping efficiency.

Figure 3:
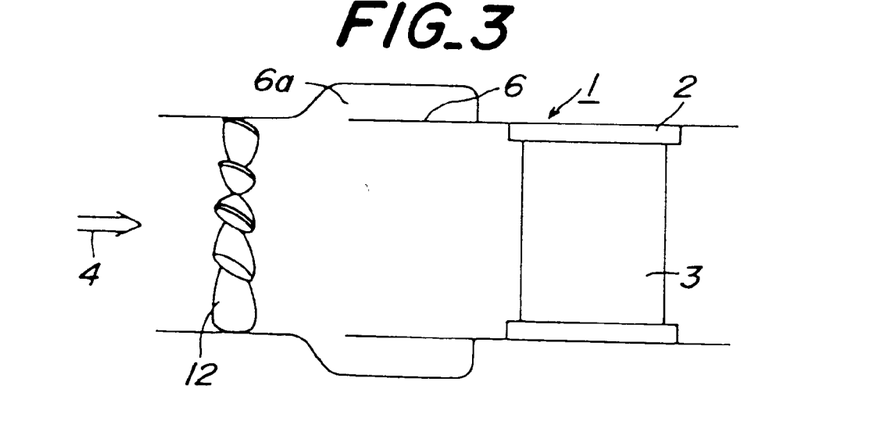
FIG. 3 is a schematic view depicting still another embodiment of the gas flow pass according to the invention.

In the embodiment shown in FIG. 3, a different feature as that of FIG. 1 is that use is made of a guide wing member 12 as the flow direction deflecting means of the gas flow 4. The guide wing member 12 has a wing shape so as to rotate the gas flow 4 along an inner wall of the gas flow pass 1 in a spiral manner. Moreover, in the embodiment shown in FIG. 3, a part of the gas flow pass 1 is expanded outward to form the pocket-like receiving member 6. This expanded portion is arranged on an overall circumferential surface. Therefore, in the embodiment shown in FIG. 3, it is possible to improve the foreign substance trapping efficiency as is the same as the embodiment shown in FIG. 2. Moreover, it is possible to form the pocket-like receiving member 6 easily. Further, since an inner diameter of the foreign substance trapping member can be made identical with inner diameters of the gas flow pass 1 at an upstream position and at a downstream position, it is possible to improve a pressure loss of the gas flow pass 1.

Figure 4:
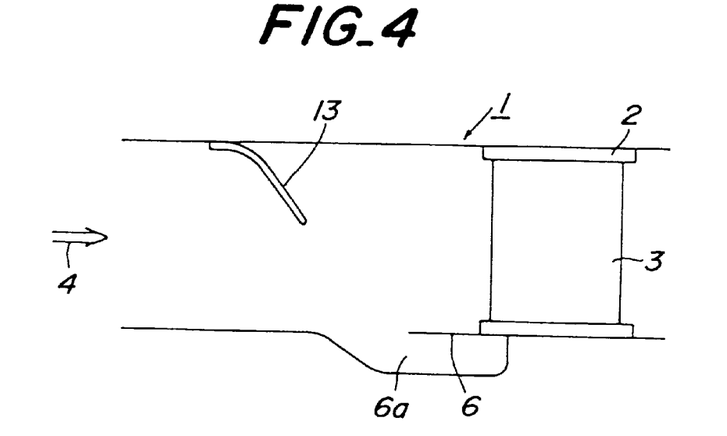
FIG. 4 is a schematic vies showing still another embodiment of the gas flow pass according to the invention.

In the embodiment shown in FIG. 4, a different feature as that of FIG. 1 is that use is made of a plate member 13 as the flow direction deflecting means of the gas flow 4. The plate member 13 is extended from an inner surface of the gas flow pass 1 toward a center of the gas flow pass 1. Moreover, a pocket-like receiving member 6 has a double pipe construction such that a part of the inner surface of the gas flow pass 1 is expanded outward from a center of the gas flow pass 1. The gas flow pass shown in FIG. 4 is preferably used in the case that the gas flow pass 1 is arranged in a horizontal direction. Further, the pocket-like receiving member 6 is arranged at a portion extended from a tip portion of the plate member 13, and exists only at a lower portion of the gas flow pass 1 with respect to a center thereof.

The foreign substances flowing from an upstream side are heavy in weight as compared with gas, and are liable to be collected at a lower portion of the gas flow pass 1. Therefore, if the foreign substance is heavy in weight or in large in size, i.e. one foreign substance has a square shape larger than 1.5 mm and/or has a weight larger than 1 g, the pocket-like receiving member 6 formed only at a lower position as shown in FIG. 4 can trap the foreign substances effectively.

Figure 5:
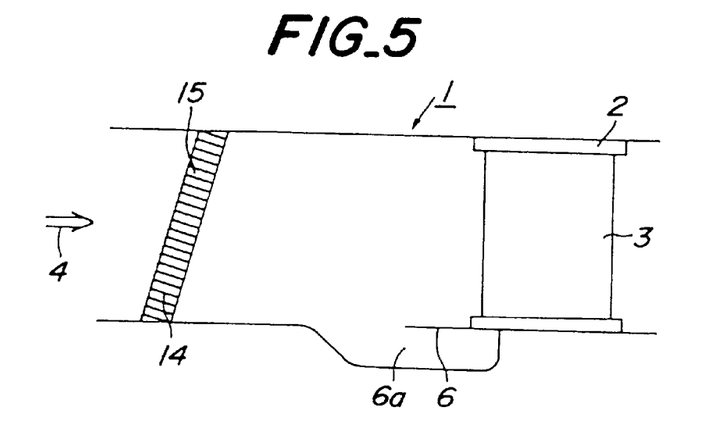
FIG. 5 is a schematic view illustrating still another embodiment of the gas flow pass according to the invention.
Figure 6:
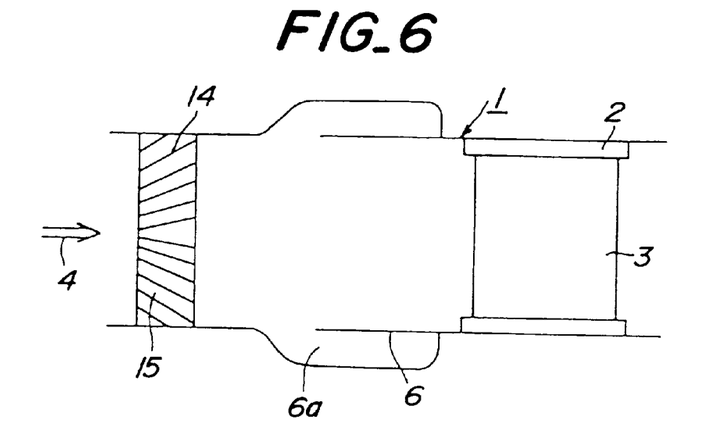
FIG. 6 is a schematic view depicting still another embodiment of the gas flow pass according to the invention.

In the embodiments shown in FIGS. 5 and 6, a different feature as that of FIG. 1 is that use is made of a honeycomb structural body 14 as the flow direction deflecting means. In the embodiment shown in FIG. 5, the pocket-like member 6 having an outwardly expanded double pipe construction is arranged only at a lower portion of the gas flow pass 1. In the embodiment shown in FIG. 6, the pocket-like member 6 having an outwardly extended double pipe construction is arranged on an overall circumferential surface of the gas flow pass 1.

Moreover, in the embodiment shown in FIG. 5, the honeycomb structural body 14 is arranged in the gas flow pass 1 in an inclined manner, so that a gas passing through a through hole 15 of the honeycomb structural body 14 flows to the pocket-like receiving member 6 arranged at a lower portion of the gas flow pass 1. Further, in the embodiment shown in FIG. 6, the honeycomb structural body 14 has a tapered through hole 15 extended outward from a center thereof, so that a gas passing through the through hole 15 flows to the pocket-like receiving member 6. In the both embodiments, the foreign substances can be trapped by the pocket-like receiving member 6 as is the same as the embodiments shown previously. In these cases, a material of the honeycomb structural body 14 is not limited. However, if the gas flow pass 1 is used in the gas flow having a high temperature, it is preferred to use the honeycomb structural body 14 made of ceramics such as cordierite or the like or metal such as a stainless steel or the like.

Figure 7:
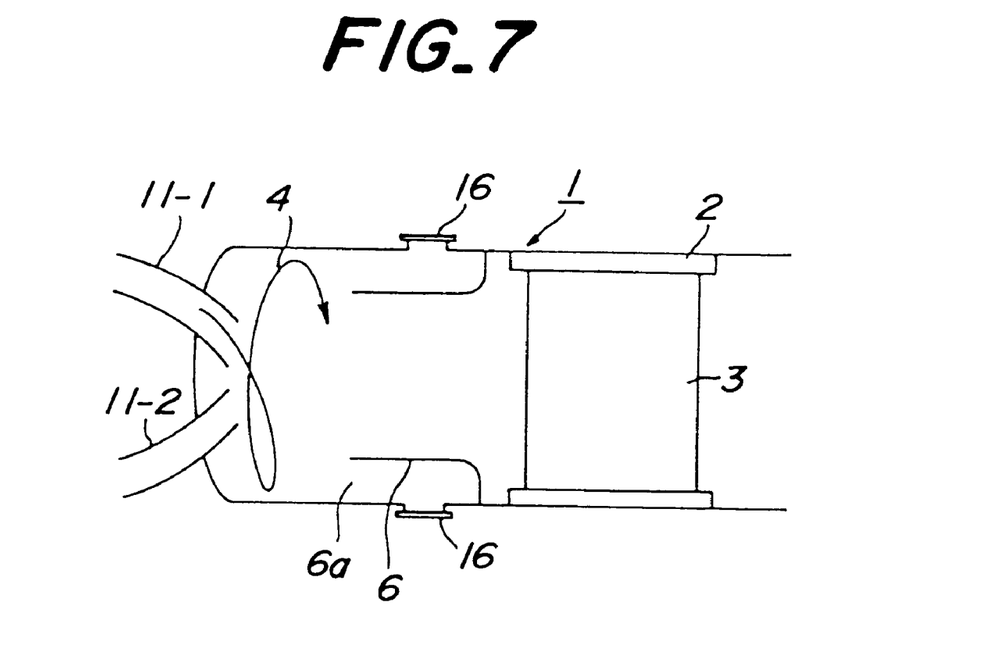
FIG. 7 is a schematic view showing still another embodiment of the gas flow pass according to the invention.
Figure 8:
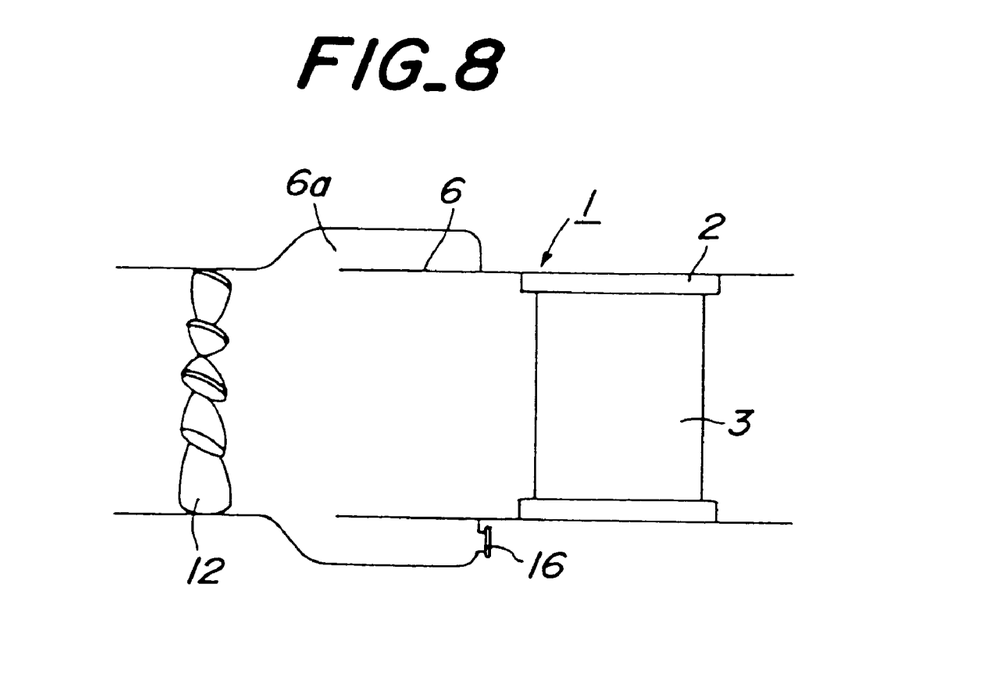
FIG. 8 is a schematic view illustrating still another embodiment of the gas flow pass according to the invention.

FIGS. 7 and 8 are schematic views respectively showing still another embodiment of the gas flow pass according to the invention. The embodiments shown in FIGS. 7 and 8 correspond to the embodiments previously shown in FIGS. 2 and 3 respectively. In the embodiments shown in FIGS. 7 and 8, one or a plurality of opening portions 16 are arranged to the pocket-like receiving member 6. The opening portion 16 functions to open or close the pocket-like receiving member 6. Therefore, it is possible to discharge the trapped foreign substances in the pocket-like receiving member 6 out of the gas flow pass 1. If the trapped foreign substance discharging operation mentioned above is repeated periodically, it is possible to prevent a return of the discharged foreign substances trapped by the pocket-like receiving member 6 into the gas flow pass 1.

Figure 9:
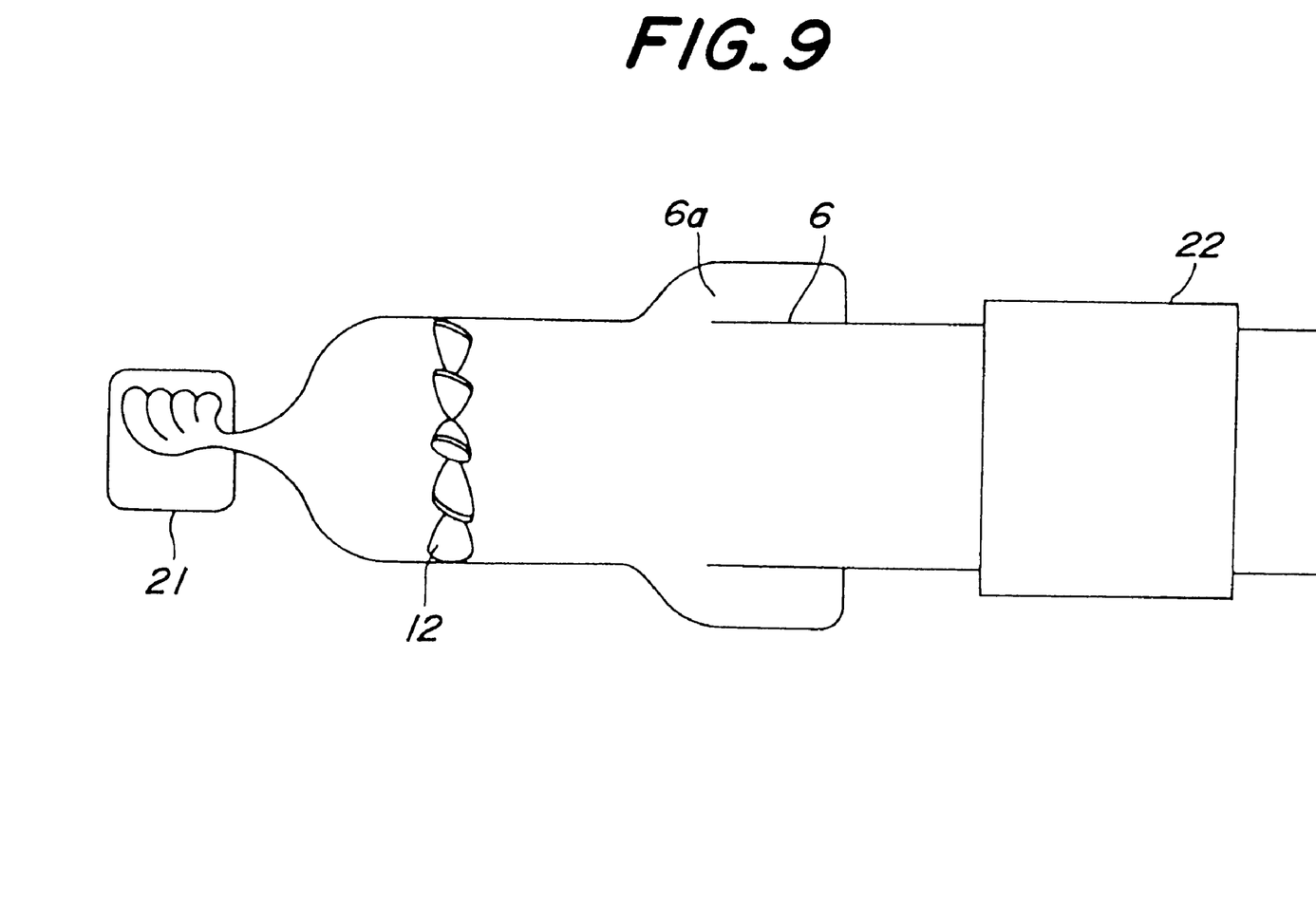
FIG. 9 is a schematic view depicting one concrete embodiment of the gas flow pass according to the invention.
Figure 10:
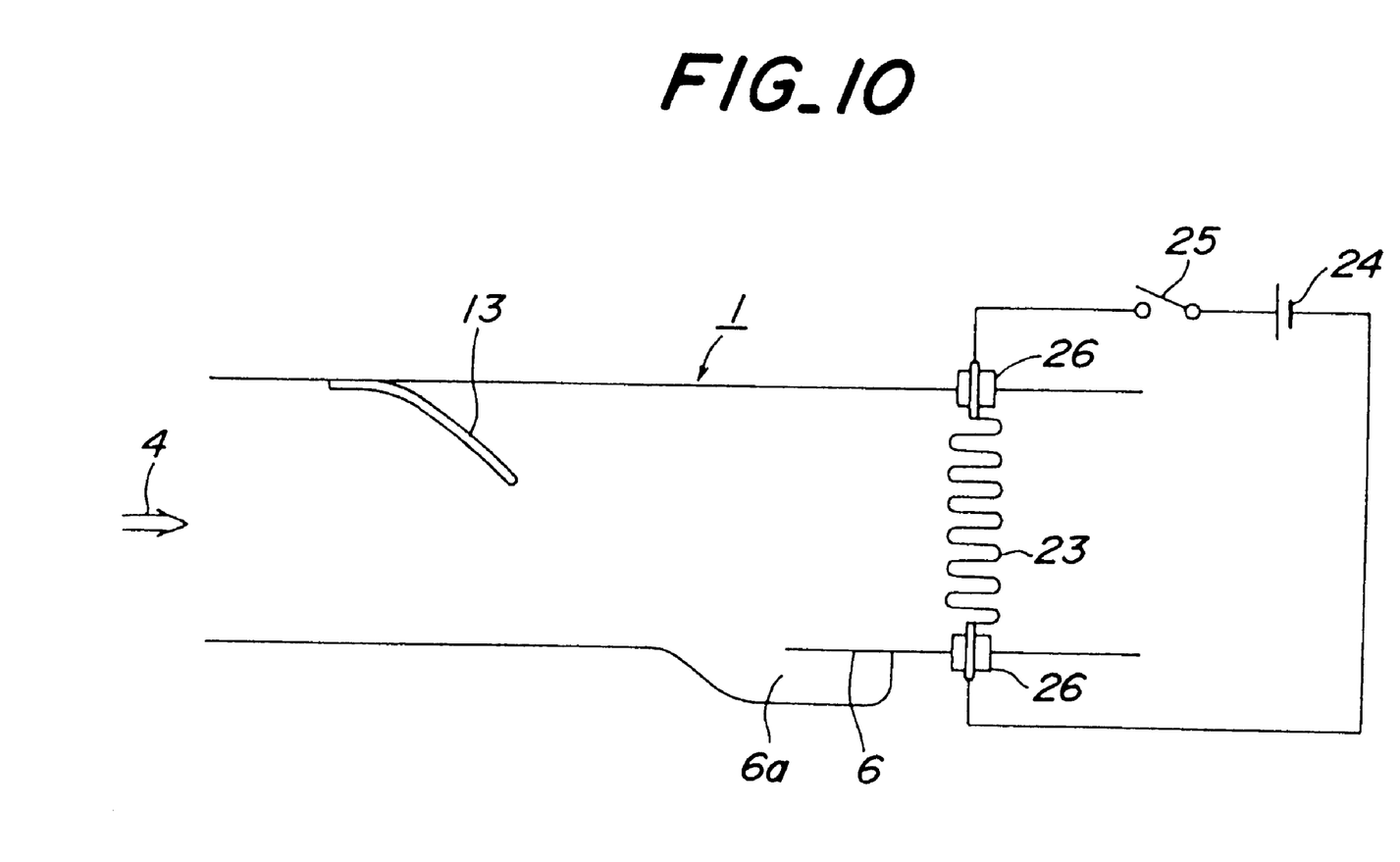
FIG. 10 is a schematic view showing another concrete embodiment of the gas flow pass according to the invention.

FIGS. 9 and 10 are schematic views respectively showing one concrete embodiment of the gas flow pass according to the invention. Both in the embodiments, an exhaust gas flow pass of an internal combustion engine is shown as the gas flow pass according to the invention. In the embodiment shown in FIG. 9, the gas flow pass 1 having the construction shown in FIG. 3 is arranged between an engine 21 and a turbo charger 22. Therefore, in the embodiment shown in FIG. 9, it is possible to prevent a breakage of the turbo charger 22 due to the foreign substances.

In the embodiment shown in FIG. 10, the gas flow pass 1 having the construction shown in FIG. 4 is arranged at an upstream position of an electric heater 23 together with a power source 24 and a switch 25. Therefore, in the embodiment shown in FIG. 10, it is possible to prevent a breakage of the electric heater 23 due to the foreign substances. It should be noted that in FIG. 10 an electric resistance wire heater is shown as the electric heater 23, but the other electric heater having a different construction such as a honeycomb structural body having a heating element can be used as the electric heater 23.

Moreover, it is possible to arrange the gas flow pass 1 at an upstream position of an exhaust gas sensor such as an oxygen sensor or the like. The gas flow pass 1 according to the invention can trap not only solid members but also liquid members in the gas. Therefore, as disclosed in Japanese Patent Laid-Open Publication No. 5-26842, it is possible to solve such a problem that water generated when the internal combustion engine starts is introduced to the sensor element of the exhaust gas sensor such as the oxygen sensor and then a crack or a breakage of the sensor element occurs.

Further, if the electric heater 23 has a conductive gas flow pass 1 arranged in a horizontal direction, for example in FIG. 10, it is preferred to arrange, all the electrodes 26 through which a power is supplied to the electric heater 23, or, the remaining electrodes 26 other than one electrode 26 which has a most similar potential as that of the pipe consisting the gas flow pass 1, at an upper portion of the gas flow pass 1, preferably at an upper portion with respect to a center of cross section of the gas flow pass 1, more preferably at a portion within a range of ±45° with respect to the uppermost portion of the gas flow pass 1. The reason why is as follows.

That is to say, in the case that the gas flow pass 1 has a conductivity and the foreign substances flowing from a upstream side have a conductivity, if the foreign substances are brought into contact with the electrodes 26 through which a power is supplied and the gas flow pass 1 at the same time, the electrodes 26 and the gas flow pass 1 are shorted in the case that both members are not electrically insulated. In this case, if a potential difference exists between the gas flow pass 1 and the electrodes 26, a current flows therebetween. The current flowing at that time becomes larger if the potential difference therebetween is larger. For example, in the case that a large current such as 50 A or 100 A is flowed, the electric heater 23 and the power source 24 are damaged, and the gas flow pass 1 is sometimes melted at the same time.

Moreover, since the foreign substances are mostly made of a metal and thus have a conductivity and heavy in weight, the foreign substances are liable to be flowed and/or accumulated at a lower portion of the gas flow pass 1 with respect to a center thereof. In order to prevent such a short circuit effectively, it is preferred to arrange the electrodes 26 at an upper portion of the gas flow pass 1, preferably at an upper portion with respect to a center of a cross section of the gas flow pass 1, more preferably at a portion within a range of ±45° with respect to the uppermost portion of the gas flow pass 1. In this manner, it is possible to reduce a generation probability of a short circuit due to the foreign substances.

Here, there is a case that it is difficult to arrange all the electrodes 26 at an upper portion of the gas flow pass 1. In such a case, it is preferred to arrange remaining electrodes other than an electrode whose potential difference from the gas flow pass 1 is minimum, i.e. the electrode having a potential most similar to that of the gas flow pass 1 at a high speed together with a gas flow, at an upper portion of the gas flow pass 1, preferably at an upper portion with respect to a center of a cross section of the gas flow pass 1, more preferably at a portion within a range of ±45° at a high speed together with a gas flow at a high speed together with a gas flow with respect to the uppermost portion of the gas flow pass 1.

Hereinafter, an actual example will be explained.

EXAMPLE

Figure 11:
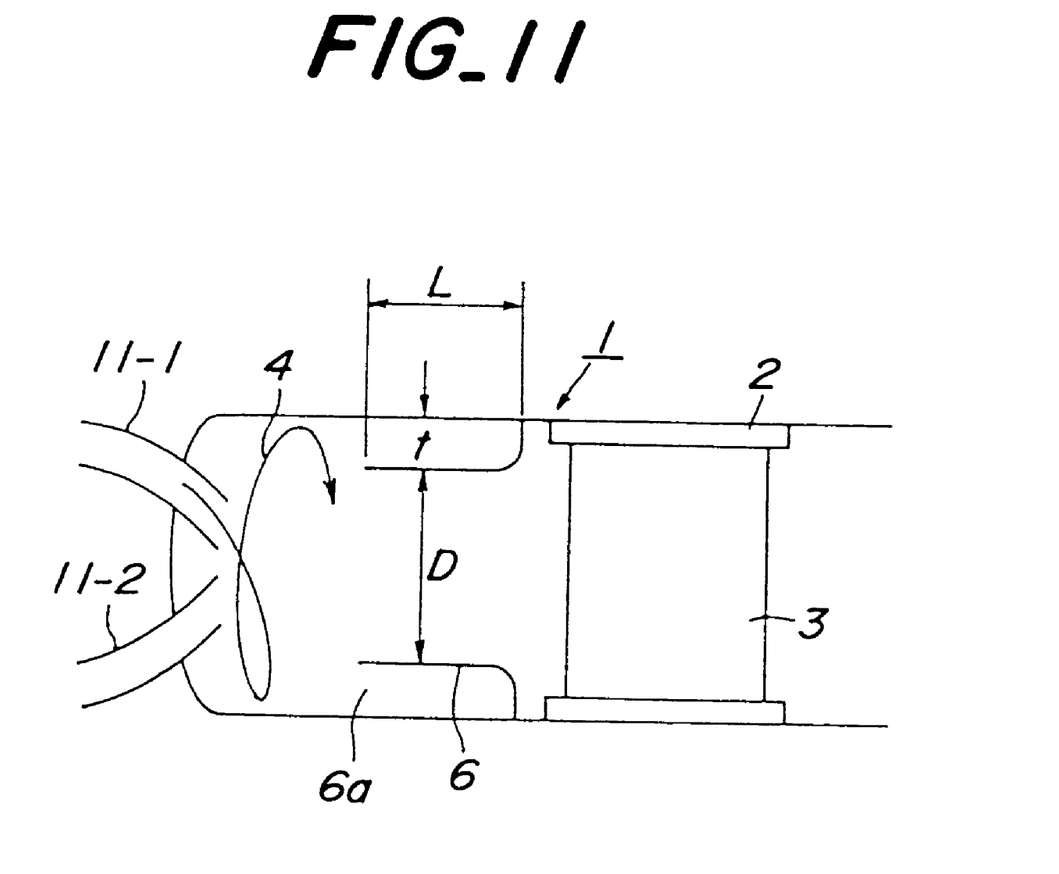
FIG. 11 is a schematic view illustrating one construction of the gas flow pass used in the embodiment.

A trapping test was performed by using an actual engine. At first, a four cylinder 2000 cc engine was arranged in the gas flow pass 1 having a construction shown in FIG. 11. Here, as shown in FIG. 11, it was assumed that an inner diameter of a gas passing portion at the pocket-like receiving member 6 of the gas flow pass 1 is D, a depth in a radial direction of the pocket-like receiving member 6 is t, and a length in a gas flow direction of the pocket-like receiving member 6 is L. Then, the trapping test was performed under such a condition that D is set to 70 mm constantly and t and L are varied so as to vary a ratio of t/D and a ratio of L/t. Moreover, 50 parts of ferrite flakes, which simulate the foreign substances in the gas flow pass 1, each having a thickness of 0.5 mm, a width of 1 mm, and a length of 1.5 nm are flowed in the gas flow pass 1 from an upstream side thereof. Moreover, an engine speed was at 3000 rpm and 5000 rpm. After that, a percentage of the ferrite flakes trapped by the pocket-like receiving member 6 was measured and compared. In this case, the results at 3000 rpm were the same as those at 5000 rpm. The results were shown in the following Table 1.

TABLE 1

|     |      | L/t |   |   |   |
| --- | ---- | --- | --- | --- | --- |
|     |      | 1 | 2 | 3 | 4 |
| t/D | 0.05 | × | × | × | × |
|     | 0.1  | × | Δ | ○ | ○ |
|     | 0.2  | × | Δ | ○ | ○ | note)
○:more than 90% of ferrite flakes were trapped.
Δ:40–90% of ferrite flakes were trapped.
×:less than 40% of ferrite flakes were trapped.

From the results shown in Table 1, in the case that t/D is 0.05, it is understood that the foreign substances in the gas flow can not be trapped sufficiently by the pocket-like receiving member 6 even if a ratio of L/t is varied. Moreover, in the case that t/D is larger than 0.1 and L/t is 1, it is understood that the once trapped foreign substances are returned into the gas flow pass again due to pulsation and/or vibration of the gas flow. As a result, it is preferred that a ratio of t/D is larger than 0.1, and a ratio of L/t is larger than 2 preferably larger than 3.

As mentioned above, according to the invention, since the gas flow direction deflecting means and the foreign substance trapping means are arranged in the gas flow pass, it is possible to deflect the gas flow to a wall surface of the gas flow pass and then it is possible to trap the foreign substances in the gas flow by the foreign substance trapping means, so that a damage of the gas flow pass due to the foreign substances can be prevented.

What is claimed is:

1. A gas flow Pass having a gas flow direction deflecting means located therein for deflecting a gas flow direction outward with respect to the center of said gas flow pass, and a foreign substance trapping means located at a downstream position of said gas flow direction deflecting means and located on at least a part of an inner surface of said gas flow pass, wherein, an inner diameter of a gas passing portion of said gas flow sass at said foreign substance trapping means is D, a depth in a radial direction of said foreign substance trapping means is t, and a length in a gas flow direction of said foreign substance trapping means is L, a ratio of t/D is larger than 0.1 and a ratio of L/t is larger than 2 preferably larger than 3.

2. A gas flow pass having a gas flow direction deflecting means located therein for deflecting a gas flow direction outward with respect to the center of said gas flow pass, and a foreign substance trapping means located at a downstream position of said gas flow direction deflecting means and located on at least a part of an inner surface of said gas flow pass;

an electric heater;

wherein said gas flow pass is arranged at an upstream position with respect to said electric heater;

at least one electric heater electrode for supplying power to said electric heater;

at least one electrode in contact with a pipe comprising the gas flow pass;

wherein, said gas flow pass has a conductivity and is arranged in a substantially horizontal direction, and said electric heater electrode is located at an upper portion of said gas flow pass with respect to the center of a cross-section of the gas flow pass.

3. The gas flow pass of claim 2 wherein said electric heater electrode is located at an upper portion of said gas flow pass within a range of ±45° with respect to the vertically uppermost portion of said gas flow pass.

4. A gas flow pass having a gas flow direction deflecting means located therein for deflecting a gas flow direction outward with respect to the center of said gas flow pass, and a foreign substance trapping means located at a downstream position of said gas flow direction deflecting means and located on at least a part of an inner surface of said gas flow pass;

an electric heater having a honeycomb structure;

at least one electric heater electrode for supplying power to said electric heater;

at least one electrode in contact with a pipe comprising the gas flow pass;

wherein said gas flow pass is located at an upstream position with respect to said electric heater; and, wherein said gas flow pass has a conductivity and is arranged in a substantially horizontal direction, and said electric heater electrode is located at an upper portion of said gas flow pass, with respect to the center of a cross-section of the gas flow pass.

5. The gas flow pass of claim 4 wherein said electric heater electrode is located at an upper portion of said gas flow pass within a range of ±45° with respect to the vertically uppermost portion of said gas flow pass.

* * * * *